(12) United States Patent
Nonomura et al.

(10) Patent No.: US 8,277,362 B2
(45) Date of Patent: Oct. 2, 2012

(54) CONTINUOUSLY VARIABLE TRANSMISSION AND CONTROL METHOD THEREOF

(75) Inventors: Ryousuke Nonomura, Kawasaki (JP);
Hiroyasu Tanaka, Atsugi (JP);
Takuichiro Inoue, Fujisawa (JP); Jouji Seki, Zama (JP); Mamiko Inoue, Ebina (JP); Seiichiro Takahashi, Isehara (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 157 days.

(21) Appl. No.: 12/828,604

(22) Filed: Jul. 1, 2010

(65) Prior Publication Data

US 2011/0015033 A1  Jan. 20, 2011

(30) Foreign Application Priority Data

Jul. 17, 2009 (JP) ................. 2009-169142

(51) Int. Cl.
B60W 10/04 (2006.01)
B60W 10/10 (2012.01)
F16H 61/662 (2006.01)
F16H 59/20 (2006.01)

(52) U.S. Cl. ............... 477/41; 477/43; 477/46; 477/141

(58) Field of Classification Search ............... 477/41, 477/43, 46, 141
See application file for complete search history.

(56) References Cited

U.S. PATENT DOCUMENTS

| | | |
|---|---|---|
| 4,672,863 A | 6/1987 | Itoh et al. |
| 4,674,359 A | 6/1987 | Hattori |
| 4,685,358 A | 8/1987 | Itoh |
| 4,793,217 A | 12/1988 | Morisawa et al. |
| 5,207,122 A | 5/1993 | Minagawa |
| 5,282,401 A | 2/1994 | Hebbale et al. |
| 5,427,579 A | 6/1995 | Kanehara et al. |
| 5,456,647 A | 10/1995 | Holbrook |
| 5,468,198 A | 11/1995 | Holbrook et al. |
| 5,820,514 A | 10/1998 | Adachi |
| 5,827,153 A | 10/1998 | Yasue et al. |
| 5,947,856 A | 9/1999 | Tabata et al. |
| 6,157,884 A | 12/2000 | Narita et al. |
| 6,295,497 B1 | 9/2001 | Kuras |
| 6,314,357 B1 | 11/2001 | Kon et al. |
| 6,821,228 B2 | 11/2004 | Aoki et al. |
| 6,855,085 B1 | 2/2005 | Gumpoltsberger |

(Continued)

FOREIGN PATENT DOCUMENTS

DE    34 24 646 A1   2/1985

(Continued)

OTHER PUBLICATIONS

U.S. Appl. No. 12/836,021, filed Jul. 14, 2010, Nonomura et al.

(Continued)

*Primary Examiner* — Edwin A Young
(74) *Attorney, Agent, or Firm* — Foley & Lardner LLP

(57) ABSTRACT

The transmission controller performs a non-coordinated shift, in which the gear position of the subtransmission mechanism is modified from the second gear position to the first gear position at a higher speed than when the gear position of the subtransmission mechanism is modified by a coordinated shift while permitting a deviation between the through speed ratio and the target through speed ratio, instead of the coordinated shift when it is determined that the second speed kick down shift is to be performed.

16 Claims, 7 Drawing Sheets

U.S. PATENT DOCUMENTS

| | | |
|---|---|---|
| 6,932,739 B2 | 8/2005 | Miyata et al. |
| 7,108,631 B2 * | 9/2006 | Inoue et al. ............. 477/37 |
| 7,393,306 B2 | 7/2008 | Tanaka |
| 7,637,836 B2 * | 12/2009 | Watanabe et al. ......... 475/210 |
| 7,833,126 B2 | 11/2010 | Venter |
| 8,055,414 B2 | 11/2011 | Tawara |
| 2002/0011792 A1 | 1/2002 | Taniguchi et al. |
| 2005/0085340 A1 | 4/2005 | Ishikawa et al. |
| 2006/0089775 A1 | 4/2006 | Whitton et al. |
| 2006/0217230 A1 | 9/2006 | Tanaka |
| 2008/0032861 A1 | 2/2008 | Maki et al. |
| 2008/0096721 A1 | 4/2008 | Honma et al. |
| 2009/0042690 A1 | 2/2009 | Tabata et al. |
| 2009/0105041 A1 * | 4/2009 | McKenzie et al. ......... 477/41 |
| 2009/0111650 A1 | 4/2009 | Jeon |
| 2010/0248875 A1 | 9/2010 | Jozaki et al. |
| 2010/0248886 A1 | 9/2010 | Jozaki et al. |
| 2010/0248894 A1 | 9/2010 | Jozaki et al. |
| 2010/0248895 A1 | 9/2010 | Jozaki et al. |
| 2011/0015033 A1 | 1/2011 | Nonomura et al. |

FOREIGN PATENT DOCUMENTS

| | | |
|---|---|---|
| DE | 199 41 009 A1 | 3/2001 |
| DE | 199 50 053 A1 | 4/2001 |
| DE | 100 51 692 A1 | 5/2001 |
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 62-181928 A | 8/1987 |
| JP | 63-125446 A | 5/1988 |
| JP | 63-266264 A | 11/1988 |
| JP | 63-266265 A | 11/1988 |
| JP | 4-211760 A | 8/1992 |
| JP | 04-307165 A | 10/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 8-178043 A | 7/1996 |
| JP | 9-210165 A | 8/1997 |
| JP | 11-51162 A | 2/1999 |
| JP | 11-093987 A | 4/1999 |
| JP | 11-108175 A | 4/1999 |
| JP | 11-210874 A | 8/1999 |
| JP | 2000-266173 A | 9/2000 |
| JP | 2000-346169 A | 12/2000 |
| JP | 2002-89701 A | 3/2002 |
| JP | 2002-106700 A | 4/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2006-112536 A | 4/2006 |
| JP | 2006-266320 A | 10/2006 |
| JP | 2007-92665 A | 4/2007 |
| JP | 2007-118727 A | 5/2007 |
| JP | 2007-146906 A | 6/2007 |

OTHER PUBLICATIONS

U.S. Appl. No. 12/836,099, filed Jul. 14, 2010, Takahashi et al.
U.S. Appl. No. 12/836,104, filed Jul. 14, 2010, Takahashi et al.
U.S. Appl. No. 12/836,128, filed Jul. 14, 2010, Takahashi et al.
U.S. Appl. No. 12/837,129, filed Jul. 15, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
T. Jozaki et al., U.S. PTO Non-Final OA, U.S. Appl. No. 12/727,516, dated Jan. 20, 2012, 10 pages.
T. Jozaki et al., U.S. PTO Notice of Allowance, U.S. Appl. No. 12/727,516, dated Apr. 26, 2012, 6 pages.
T. Jozaki et al., U.S. PTO *Ex parte Quayle* Office Action, U.S. Appl. No. 12/727,500, dated Apr. 30, 2012, 12 pages.
T. Jozaki et al. USPTO Notice of Allowance, U.S. Appl. No. 12/727,500, Jul. 11, 2012, 12 pgs.
T. Jozaki et al., USPTO Notice of Allowance, U.S. Appl. No. 12/727,497, Aug. 1, 2012, 12 pgs.

* cited by examiner

CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a continuously variable speed change mechanism and a subtransmission mechanism.

BACKGROUND OF THE INVENTION

JP60-37455A discloses a continuously variable transmission in which a two-forward speed subtransmission mechanism is provided in series with a continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

JP5-79554A discloses control (to be referred to hereafter as a "coordinated shift") employed in this type of continuously variable transmission including a subtransmission mechanism which varies a speed ratio of the variator in an opposite direction to a speed ratio variation direction of the subtransmission mechanism in accordance with change of the gear position of the subtransmission mechanism. When this coordinated shift is performed, speed variation occurring in an engine and a torque converter during a shift in the subtransmission mechanism is suppressed, thereby preventing shift shock caused by inertia torque from the engine and torque converter.

SUMMARY OF THE INVENTION

In the continuously variable transmission including a subtransmission mechanism described above, similarly to a normal transmission, a kick down shift is performed when an accelerator pedal is greatly depressed. In the kick down shift, driving force must be increased by varying a through speed ratio, which is an overall speed ratio of the variator and the subtransmission mechanism, quickly to a large speed ratio side in order to respond to an acceleration request from a driver.

However, when the need to modify the gear position of the subtransmission mechanism arises during the kick down shift while a coordinated shift is underway, a large amount of time may be required to complete the shift, leading to a delay in driving force increase and deterioration of a shift feeling. The reason for this is that a shift speed of the variator is slower than a shift speed of the subtransmission mechanism, and therefore the time required for the coordinated shift is dependent on the shift speed of the variator.

This invention has been designed in consideration of such technical problems, and an object thereof is to vary a through speed ratio to a large speed ratio side quickly even during a kick down shift accompanying modification of a gear position of a subtransmission mechanism, thereby preventing a delay in driving force increase and improving a shift feeling.

According to an aspect of the present invention, a continuously variable transmission installed in a vehicle, includes a variator capable of varying a speed ratio continuously; a subtransmission mechanism provided in series with the variator and having a first gear position and a second gear position as forward gear positions, the second gear position having a smaller speed ratio than the first gear position; a destination through speed ratio setting unit which sets, on the basis of an operating condition of the vehicle, a destination through speed ratio, which is a target value to be reached by a through speed ratio serving as an overall speed ratio of the variator and the subtransmission mechanism in accordance with the operating condition; a target through speed ratio setting unit which sets, on the basis of the destination through speed ratio, a target through speed ratio serving as a transitional target value for making the through speed ratio to follow the destination through speed ratio at a predetermined transient response; a shift control unit which controls at least one of the variator and the subtransmission mechanism such that the through speed ratio follows the target through speed ratio; a coordinated shifting unit which performs a coordinated shift, in which the speed ratio of the subtransmission mechanism is varied while varying the speed ratio of the variator in an opposite direction to a speed ratio variation direction of the subtransmission mechanism so that the through speed ratio reaches the target through speed ratio, when modifying a gear position of the subtransmission mechanism; a second speed kick down shift determining unit which determines that a second speed kick down shift accompanied by modification of the gear position of the subtransmission mechanism from the second gear position to the first gear position is to be performed due to depression of an accelerator pedal; and a non-coordinated shifting unit which performs a non-coordinated shift, in which the gear position of the subtransmission mechanism is modified from the second gear position to the first gear position at a higher speed than when the gear position of the subtransmission mechanism is modified by the coordinated shift while permitting a deviation between the through speed ratio and the target through speed ratio, instead of the coordinated shift performed by the coordinated shifting unit when the second speed kick down shift determining unit determines that the second speed kick down shift is to be performed.

According to another aspect of the present invention, a control method for a continuously variable transmission which is installed in a vehicle and includes a variator capable of varying a speed ratio continuously, and a subtransmission mechanism provided in series with the variator and having a first gear position and a second gear position as forward gear positions, the second gear position having a smaller speed ratio than the first gear position, is provided. The control method includes setting, on the basis of an operating condition of the vehicle, a destination through speed ratio, which is a target value to be reached by a through speed ratio serving as an overall speed ratio of the variator and the subtransmission mechanism in accordance with the operating condition; setting, on the basis of the destination through speed ratio, a target through speed ratio serving as a transitional target value for making the through speed ratio to follow the destination through speed ratio at a predetermined transient response; controlling at least one of the variator and the subtransmission mechanism such that the through speed ratio follows the target through speed ratio; performing a coordinated shift, in which the speed ratio of the subtransmission mechanism is varied while varying the speed ratio of the variator in an opposite direction to a speed ratio variation direction of the subtransmission mechanism so that the through speed ratio reaches the target through speed ratio, when modifying a gear position of the subtransmission mechanism; determining that a second speed kick down shift accompanied by modification of the gear position of the subtransmission mechanism from the second gear position to the first gear position is to be performed due to depression of an accelerator pedal; and performing a non-coordinated shift, in which the gear position of the subtransmission mechanism is modified from the second gear position to the first gear position at a higher speed than when the gear position of the subtransmission mechanism is modified by the coordinated shift while permitting a deviation between the through speed ratio and the target through speed ratio, instead of the coordinated shift when it is determined that the second speed kick down shift is to be pedalmed.

According to these aspects, when the accelerator pedal is depressed such that a second speed kick down shift accompanied by modification of the gear position of the subtransmission mechanism from the second gear position to the first gear position is performed, the non-coordinated shift is performed instead of the coordinated shift. As a result, the through speed ratio of the transmission can be varied to a large speed ratio side quickly, enabling rapid driving force increase and an improvement in shift feeling.

DESCRIPTION OF THE PREFERRED EMBODIMENTS

An embodiment of this invention will be described below with reference to the attached figures. It should be noted that in the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
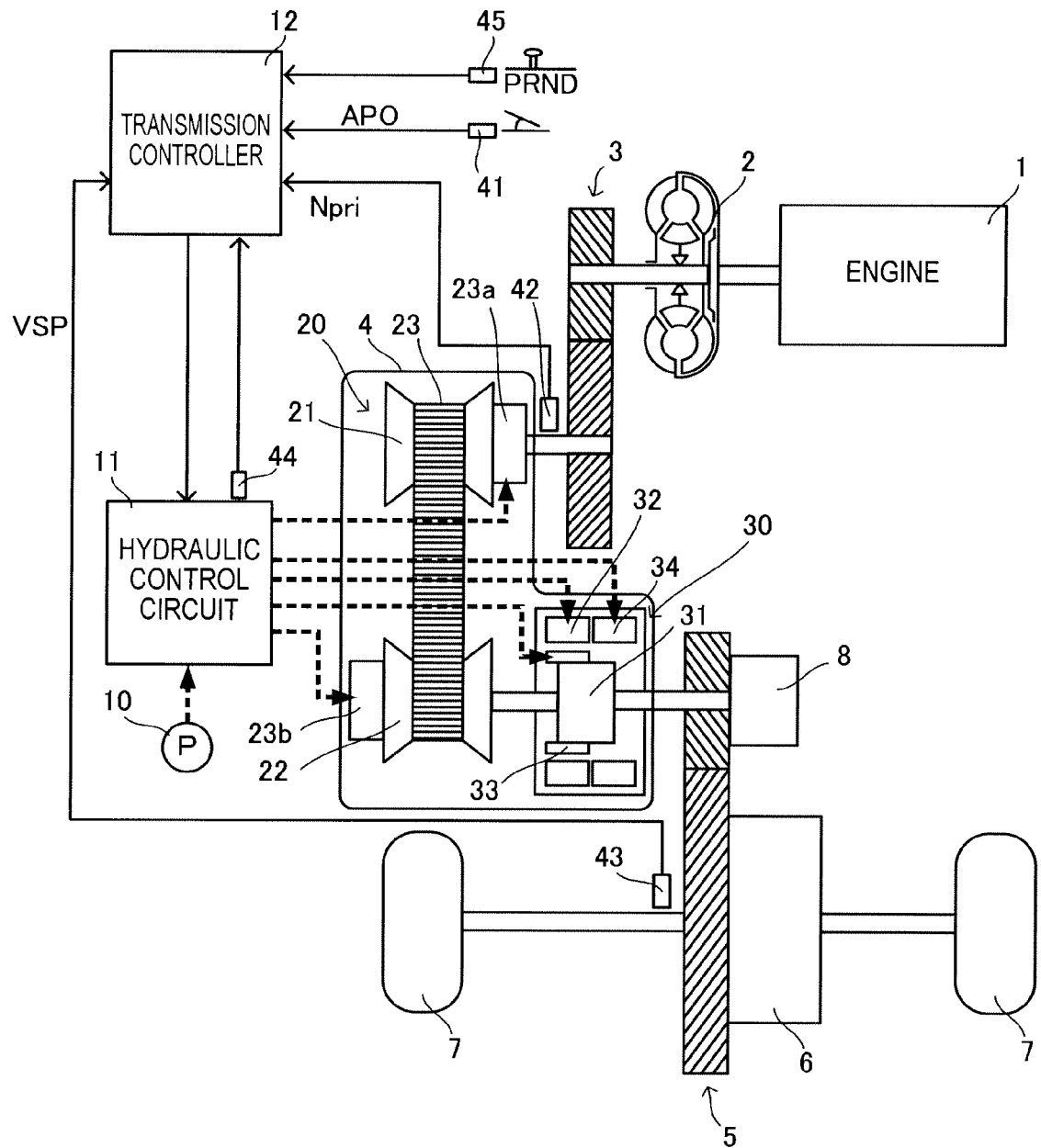
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2 including a lockup clutch, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a continuously variable speed change mechanism (to be referred to hereafter as a "variator 20"), and a subtransmission mechanism 30 provided in series with the variator 20. Here, "provided in series" means that the variator 20 and the subtransmission mechanism 30 are provided in series on a power transmission path. The subtransmission mechanism 30 may be connected to an output shaft of the variator 20 directly, as in this example, or via another speed change/power transmission mechanism (a gear train, for example).

The variator 20 includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotary elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
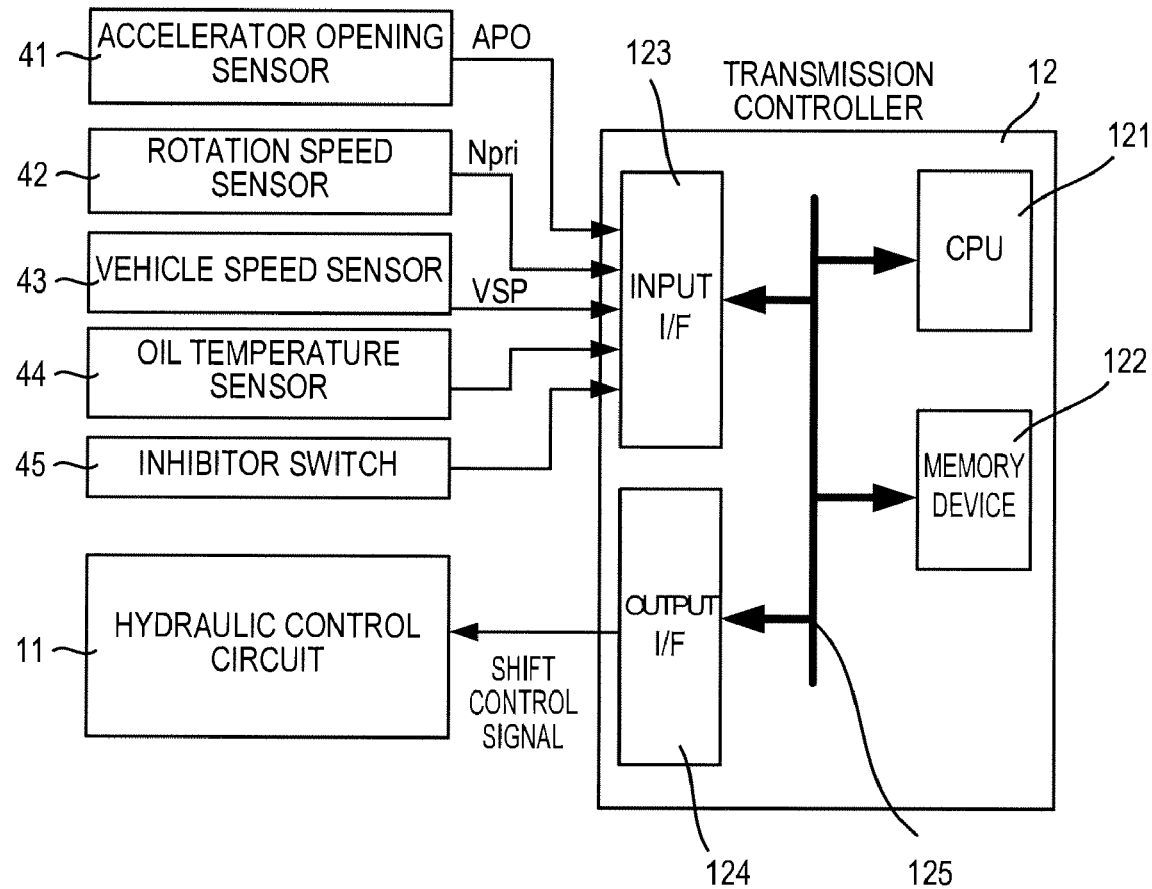
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21; to be referred to hereafter as a "primary rotation speed Npri"), an output signal from a vehicle speed sensor 43 that detects a vehicle speed VSP, an output signal from an oil temperature sensor 44 that detects an oil temperature of the transmission 4, an output signal from an inhibitor switch 45 that detects a position of a select lever, and so on are input into the input interface 123.

The memory device 122 stores a shift control program of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the speed ratio vRatio of the variator 20 and the gear position of the subtransmission mechanism 30 are changed, whereby a shift is performed in the transmission 4.

Figure 3:
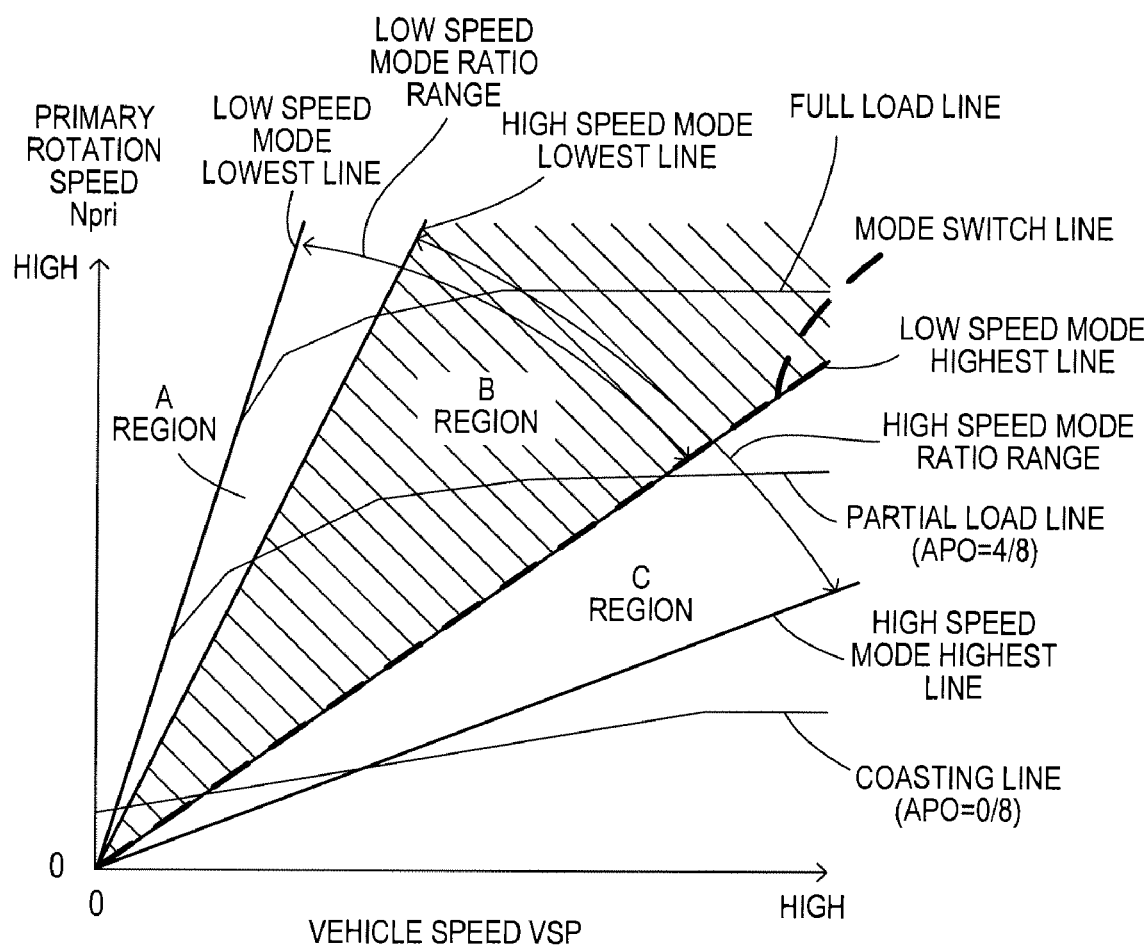
FIG. 3 is a view showing an example of a shift map.

FIG. 3 shows an example of the shift map stored in the memory device 122.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio subRatio of the subtransmission mechanism 30 by the speed ratio vRatio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial load line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio of the variator 20 at maximum and a low speed mode Highest line obtained by setting the speed ratio of the variator 20 at minimum. Namely, in the low speed mode, the operating point of the transmission 4 moves within an A region and a B region in the figure. When the transmission 4 is in the high speed mode, on the other hand, the transmission 4 can be shifted between a high speed mode Lowest line obtained by setting the speed ratio of the variator 20 at maximum and a high speed mode Highest line obtained by setting the speed ratio of the variator 20 at minimum. Namely, in the high speed mode, the operating point of the transmission 4 moves within the B region and a C region in the figure.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

The transmission controller 12 refers to this shift map to set a through speed ratio Ratio corresponding to the vehicle speed VSP and the accelerator opening APO (the operating conditions of the vehicle) as a destination through speed ratio DRatio. The destination through speed ratio DRatio is a target value to be reached ultimately by the through speed ratio Ratio under the operating conditions. The transmission controller 12 then sets a target through speed ratio tRatio serving as a transitional target value used to make the through speed ratio Ratio to follow the destination through speed ratio DRatio at a desired response characteristic, and controls the variator 20 and the subtransmission mechanism 30 such that the through speed ratio Ratio matches the target through speed ratio tRatio.

Also on the shift map, a mode switch shift line (a 1-2 shift line of the subtransmission mechanism 30) at which a shift is performed in the subtransmission mechanism 30 is set to overlap the low speed mode Highest line. A through speed ratio (a "mode switch speed ratio mRatio" hereafter) corresponding to the mode switch shift line is equal to the low speed mode Highest speed ratio.

When the operating point of the transmission 4 crosses the mode switch shift line, or in other words when the through speed ratio Ratio of the transmission 4 varies across the mode switch speed ratio mRatio, the transmission controller 12 performs mode switch shift control. In the mode switch shift control, the transmission controller 12 performs a shift in the subtransmission mechanism 30 and performs a coordinated shift to vary the speed ratio vRatio of the variator 20 in an opposite direction to a variation direction of the speed ratio subRatio of the subtransmission mechanism 30.

In the coordinated shift, when the through speed ratio Ratio of the transmission 4 shifts from a state of being larger than the mode switch speed ratio mRatio to a state of being smaller, the transmission controller 12 modifies the gear position of the subtransmission mechanism 30 from the first speed to the second speed (to be referred to as a "1-2 shift" hereafter) and varies the speed ratio vRatio of the variator 20 to a large speed ratio side. Conversely, when the through speed ratio Ratio of the transmission 4 shifts from a state of being smaller than the mode switch speed ratio mRatio to a state of being larger, the transmission controller 12 modifies the gear position of the subtransmission mechanism 30 from the second speed to the first speed (to be referred to as a "2-1 shift" hereafter) and varies the speed ratio vRatio of the variator 20 to a small speed ratio side.

The purpose of performing the coordinated shift during a mode switch shift is to ensure that a driver does not experience an uncomfortable feeling due to input rotation variation caused by a step in the through speed ratio Ratio of the transmission 4. Further, the reason why the mode switch shift is performed when the speed ratio vRatio of the variator 20 corresponds to the Highest speed ratio is that in this state, torque input into the subtransmission mechanism 30 is at a minimum under the torque input into the variator 20 at that time, and by shifting the subtransmission mechanism 30 in this state, shift shock in the subtransmission mechanism 30 can be alleviated.

Figure 4:
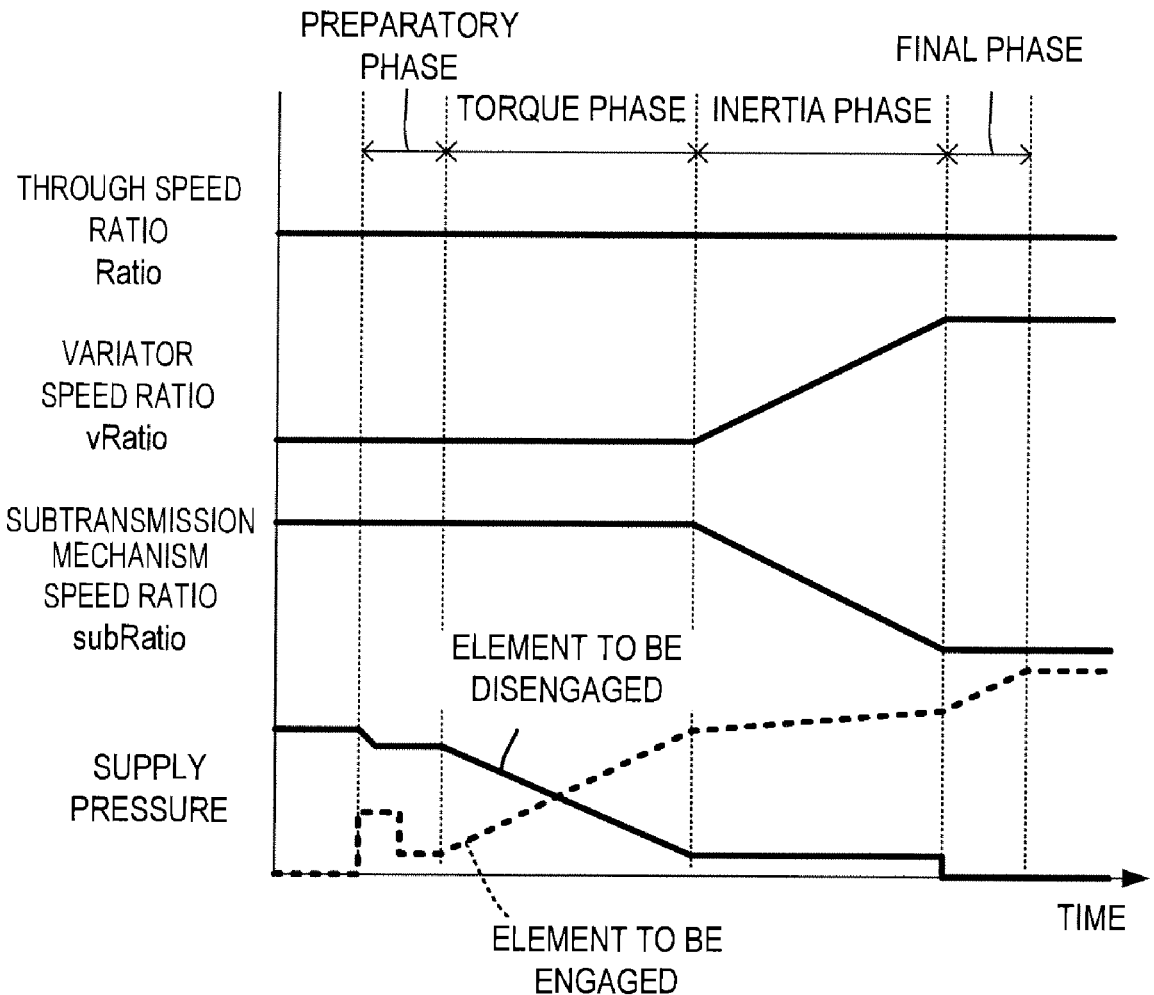
FIG. 4 is a view illustrating a coordinated shift.

FIG. 4 is a time chart showing the manner in which the coordinated shift described above is performed. A shift in the subtransmission mechanism 30 is constituted by four phases, namely a preparatory phase, a torque phase, an inertia phase, and a final phase.

In the preparatory phase, oil pressure is precharged to a frictional engagement element to be engaged to set the frictional engagement element to be engaged in a state of standby immediately prior to engagement. The frictional engagement element to be engaged is a frictional engagement element that is engaged in a post-shift gear position, and corresponds to the High clutch 33 in the case of a 1-2 shift and the Low brake 32 in the case of a 2-1 shift.

In the torque phase, oil pressure supplied to a frictional engagement element to be disengaged is reduced and the oil pressure supplied to the frictional engagement element to be engaged is increased, whereby the gear position to be subjected to torque transmission is shifted from a gear position of the frictional engagement element to be disengaged to a gear position of the frictional engagement element to be engaged. The frictional engagement element to be disengaged is the Low brake 32 in the case of a 1-2 shift and the High clutch 33 in the case of a 2-1 shift.

In the inertia phase, the speed ratio subRatio of the subtransmission mechanism 30 varies from a speed ratio of the pre-shift gear position to a speed ratio of the post-shift gear position. In the inertia phase, the transmission controller 12 generates a target speed ratio tsubRatio of the subtransmission mechanism 30 that shifts from the speed ratio of the pre-shift gear position of the subtransmission mechanism 30 to the speed ratio of the post-shift gear position smoothly and at an approximately identical shift speed to the shift speed of the variator 20, and calculates a target speed ratio tvRatio of the variator 20 by dividing the target through speed ratio tRatio by the target speed ratio tsubRatio of the subtransmission mechanism 30. The transmission controller 12 then controls the variator 20 such that the speed ratio vRatio of the variator 20 matches the target speed ratio tvRatio, and feedback-controls the oil pressure supplied to the Low brake 32 and the High clutch 33 such that the speed ratio subRatio of the subtransmission mechanism 30 matches the target speed ratio tsubRatio. As a result, the respective speed ratios of the variator 20 and the subtransmission mechanism 30 are controlled in opposite directions while realizing the target through speed ratio tRatio.

In the final phase, the frictional engagement element to be disengaged is fully disengaged by setting the oil pressure supplied to the frictional engagement element to be disengaged at zero, and the frictional engagement element to be engaged is fully engaged by increasing the oil pressure supplied to the frictional engagement element to be engaged.

The four phases occur in this order during an upshift (an auto-upshift) occurring when the driver depresses the accelerator pedal such that the vehicle speed increases and a downshift (a coasting downshift) occurring when the driver releases the accelerator pedal such that the vehicle speed decreases. During an upshift (a foot release upshift) occurring when the driver takes his/her foot of the accelerator pedal and a downshift (a depression downshift, including a kick down shift to be described below) occurring when the driver depresses the accelerator pedal, however, the order of the torque phase and the inertia phase is reversed.

In FIG. 4, the through speed ratio Ratio does not vary before and after a coordinated shift, and the reason for this is that the target through speed ratio tRatio takes a fixed value before and after the coordinated shift. The coordinated shift according to this specification is not limited to this type of shift, and encompasses all shifts in which the through speed ratio Ratio is controlled to the target through speed ratio tRatio by varying the speed ratio of the variator 20 in an opposite direction to the speed ratio variation direction of the subtransmission mechanism 30 during modification of the gear position of the subtransmission mechanism 30.

When the driver depresses the accelerator pedal greatly in the transmission 4 constituted as described above, a kick down shift is performed, similarly to a conventional transmission. In the kick down shift, driving force must be increased by varying the through speed ratio Ratio quickly to the large speed ratio side in order to respond to the acceleration request from the driver. However, in a case where the gear position of the subtransmission mechanism 30 prior to the kick down shift is the second speed and a kick down shift (to be referred to hereafter as a "second speed kick down shift") is performed accompanied by a 2-1 shift in the subtransmission mechanism 30, variation of the through speed ratio Ratio is delayed if the 2-1 shift in the subtransmission mechanism 30 is performed using the coordinated shift described above, and as a result, driving force cannot be increased quickly. Moreover, the shift feeling deteriorates.

Hence, when a second speed kick down shift is performed, the transmission controller 12 performs a non-coordinated shift to be described below instead of the coordinated shift described above in order to vary the through speed ratio Ratio to the large speed ratio side quickly.

In a non-coordinated shift, deviation is permitted between the through speed ratio Ratio and the target through speed ratio tRatio. More specifically, in the inertia phase of the subtransmission mechanism 30, first the transmission controller 12 generates a target speed ratio tsubRatio of the subtransmission mechanism 30 that shifts from the second speed speed ratio to the first speed speed ratio smoothly and more slowly than during a coordinated shift. The target speed ratio tsubRatio generated here is a value used only to control the variator 20, and the subtransmission mechanism 30 is controlled independently of this target speed ratio tsubRatio.

The transmission controller 12 then calculates the target speed ratio tvRatio of the variator 20 by dividing the target through speed ratio tRatio by the target speed ratio tsubRatio of the subtransmission mechanism 30, and controls the variator 20 such that the speed ratio of the variator 20 matches the target speed ratio tvRatio. The target speed ratio tsubRatio of the subtransmission mechanism 30 varies more gently than during a coordinated shift, and therefore the target speed ratio tvRatio of the variator 20 also varies gently. As a result, speed ratio variation in the variator 20 is suppressed during the non-coordinated shift. The reason why speed ratio variation in the variator 20 must be suppressed during the non-coordinated shift is that when the variator 20 is shifted in coordination with speed ratio variation in the subtransmission mechanism 30, similarly to a coordinated shift, a shift to a small speed ratio side and a shift to the large speed ratio side may be generated continuously within a brief time period, and as a result, the fuel efficiency may deteriorate due to shift loss in the variator 20 and the controllability of the subtransmission mechanism 30 may deteriorate due to source pressure variation and variation in the torque input into the subtransmission mechanism 30 caused by the shift in the variator 20.

Further, during the non-coordinated shift, the transmission controller 12 modifies the gear position of the subtransmission mechanism 30 from the second speed to the first speed at a higher shift speed than during the coordinated shift. More specifically, the oil pressure supplied to the High clutch 33 is reduced more quickly than during a coordinated shift and the oil pressure supplied to the Low brake 32 is increased more quickly than during the coordinated shift. As a result, the gear position to be subjected to torque transmission is shifted from the second speed to the first speed quickly, and the 2-1 shift in the subtransmission mechanism 30 is completed in a shorter time than during the coordinated shift.

Hence, according to the non-coordinated shift, deviation occurs between the through speed ratio Ratio and the target through speed ratio tRatio, but even in the case of a second speed kick down shift accompanying a 2-1 shift in the subtransmission mechanism 30, the through speed ratio Ratio of the transmission 4 can be varied to the large speed ratio side quickly, and as a result, driving force can be increased quickly to realize the acceleration expected by the driver, and a favorable shift feeling can be realized.

With a non-coordinated shift, although the through speed ratio Ratio can be varied to the large speed ratio side quickly, the through speed ratio Ratio may exceed the destination through speed ratio DRatio due to advancement of a shift timing of the subtransmission mechanism 30.

In this case, the primary rotation speed Npri increases beyond the primary rotation speed Npri realized when the through speed ratio Ratio reaches the destination through speed ratio DRatio. Depending on the degree of the increase (for example, an increase of 300 revolutions or more), the driver may experience an uncomfortable feeling even though acceleration is underway (i.e. overshoot may occur).

Figure 5A:
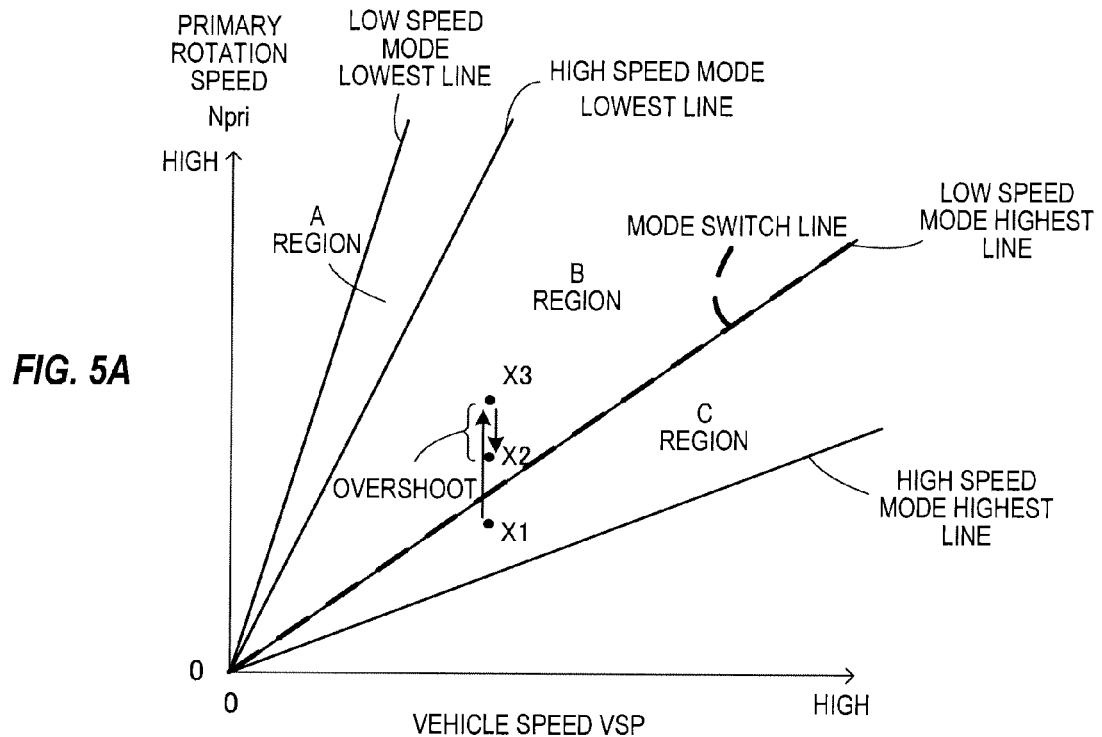
FIG. 5A is a view illustrating overshoot generation.

FIG. 5A shows the manner in which overshoot occurs. Assuming that the accelerator pedal is depressed at an operating point X1 such that a kick down shift is performed toward an operating point X2 corresponding to the destination through speed ratio DRatio, according to the non-coordinated shift described above, the subtransmission mechanism 30 is shifted first, and therefore the operating point X1 shifts temporarily to an operating point X3 before shifting to the operating point X2. At this time, the primary rotation speed Npri at the operating point X3 increases beyond the primary rotation speed Npri at the operating point X2, and if the increase is large, the driver experiences an uncomfortable feeling.

Further, when the primary rotation speed Npri is high before the start of the non-coordinated shift, the primary rotation speed Npri may exceed an upper limit value thereof due to overshoot (i.e. over-revving may occur). The upper limit value of the primary rotation speed Npri is set at the smaller of a value obtained by dividing an upper limit value of the rotation speed of the engine 1 by a speed ratio of the first gear train 3 and an upper limit value of the input rotation speed of the transmission 4, for example at 6000 revolutions, and when the primary rotation speed Npri exceeds its upper limit value, i.e. when over-revving occurs, the engine 1 and the transmission 4 may be adversely affected.

Figure 5B:
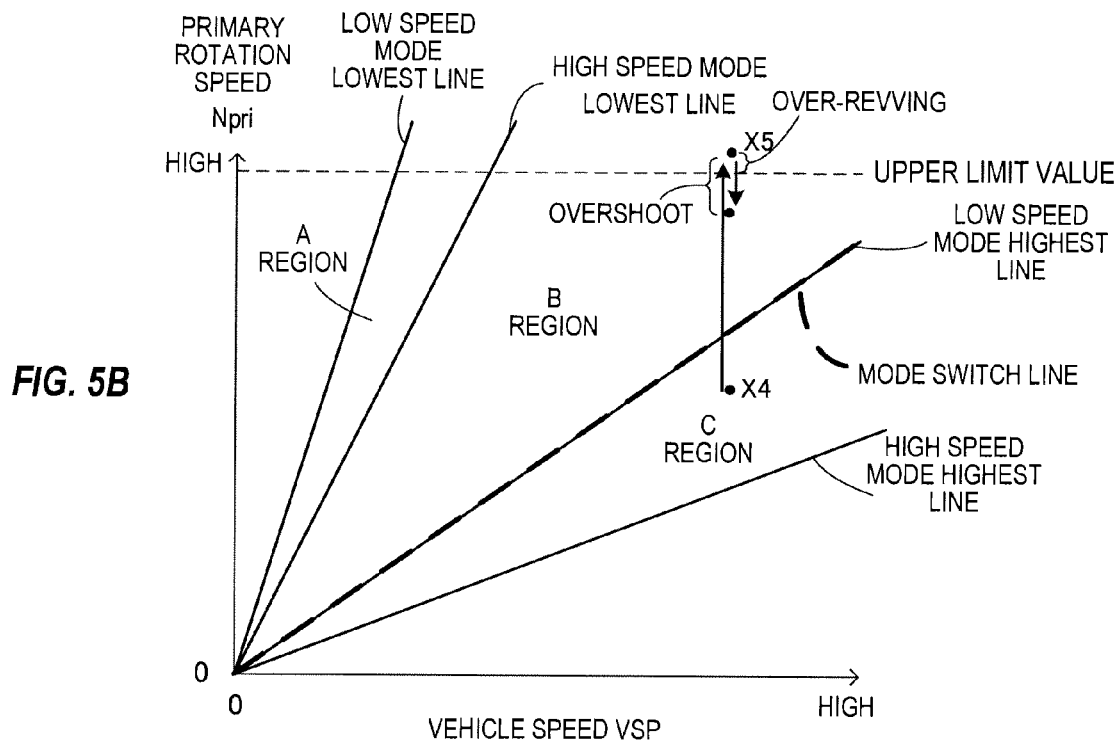
FIG. 5B is a view illustrating over-revving generation.

FIG. 5B shows the manner in which over-revving occurs. Assuming that the accelerator pedal is depressed at an operating point X4, overshoot occurs similarly to FIG. 5A, and furthermore, since the primary rotation speed Npri is already high before the start of the non-coordinated shift, the primary rotation speed Npri exceeds its upper limit value (operating point X5).

Hence, when a second speed kick down shift is performed, the transmission controller 12 determines whether or not overshoot and over-revving will occur prior to the non-coordinated shift, and when it is deter mined that overshoot and over-revving will occur, the transmission controller 12 performs a coordinated shift instead of a non-coordinated shift.

Figure 6:
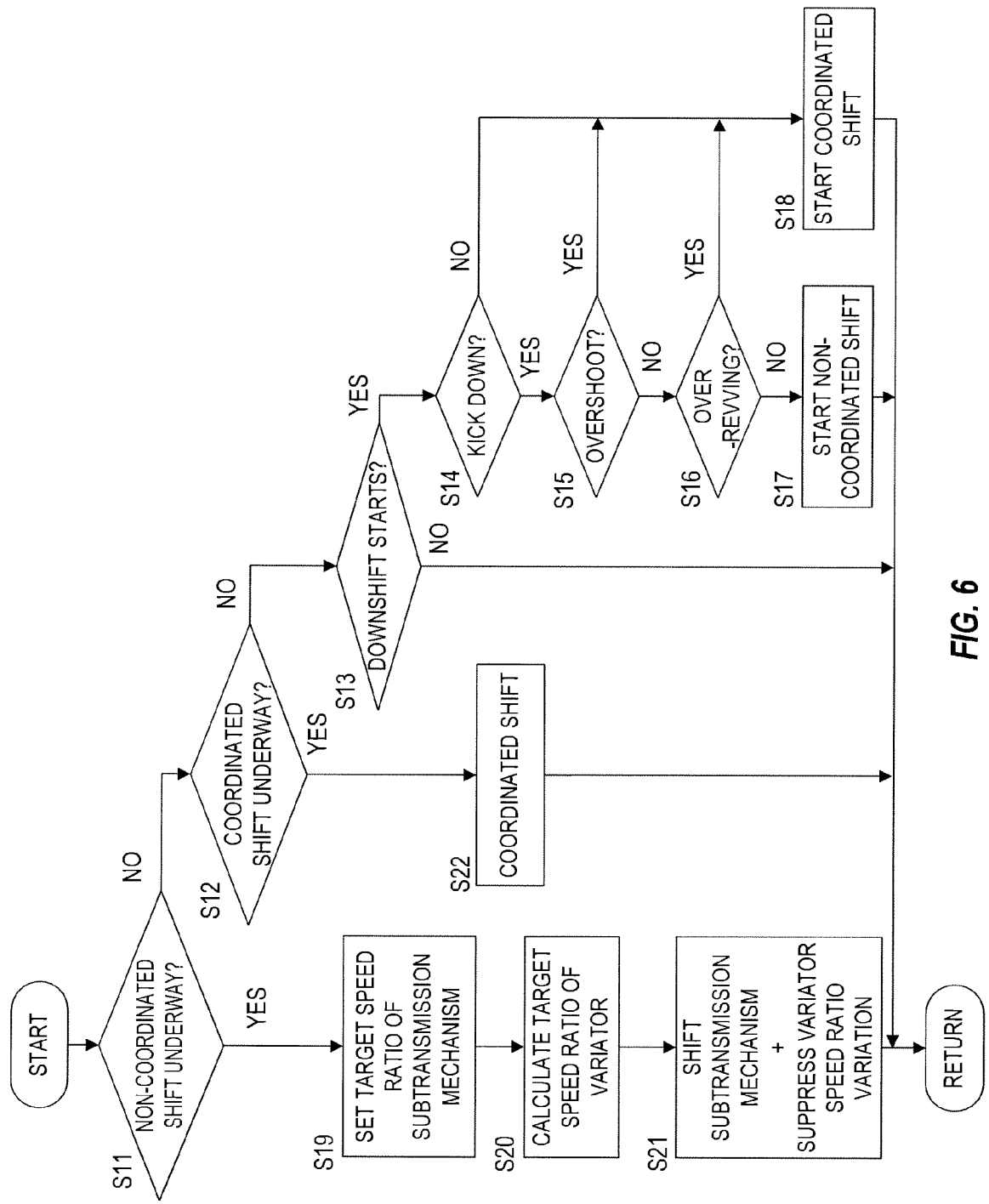
FIG. 6 is a flowchart showing an example of a control program executed to select either a coordinated shift or a non-coordinated shift during a second speed kick down shift.

FIG. 6 shows an example of a control program executed to select either a coordinated shift or a non-coordinated shift during a second speed kick down shift. The specific content of the control performed by the transmission controller 12 during a second speed kick down shift will now be described with reference to FIG. 6. The flowchart shown in FIG. 6 is executed at predetermined time intervals (every 10 msec, for example).

In S11, the transmission controller 12 determines whether a non-coordinated shift is underway. When a non-coordinated shift has been started in S17, to be described below, and this non-coordinated shift is not yet compete, it is determined that a non-coordinated shift is underway and the processing advances to S19. When it is determined that a non-coordinated shift is not underway, the processing advances to S12.

In S12, the transmission controller 12 determines whether a coordinated shift is underway. When a coordinated shift has been started in S18, to be described below, and this coordinated shift is not yet compete, it is determined that a coordinated shift is underway and the processing advances to S22. When it is determined that a coordinated shift is not underway, the processing advances to S13.

In S13, the transmission controller 12 determines whether a downshift has begun. The determination as to whether a downshift has begun is made by comparing the through speed ratio Ratio with the destination through speed ratio DRatio and determining that a downshift has begun when the through speed ratio Ratio is larger than the destination through speed ratio DRatio. When it is determined that a downshift has begun, the processing advances to S14, and when a downshift has not begun, the processing is terminated.

In S14, the transmission controller 12 determines whether the downshift is a second speed kick down shift accompanying a 2-1 shift in the subtransmission mechanism 30. The determination as to whether or not the downshift is a second speed kick down shift is made on the basis of variation in the accelerator opening APO before and after accelerator depression, the post-depression accelerator opening APO, whether or not the destination through speed ratio DRatio has varied to a large side of the mode switch speed ratio mRatio, and so on. When a second speed kick down shift is determined, the processing advances to S15, and when a second speed kick down shift is not determined, the processing advances to S18.

In S15, the transmission controller 12 determines whether overshoot would occur in the primary rotation speed Npri if a non-coordinated shift were performed. This determination is made in the following manner.

First, the transmission controller 12 estimates a maximum value of a value that can be taken by the primary rotation speed Npri during a non-coordinated shift. The maximum value is estimated by multiplying a ratio between gear positions (=first speed speed ratio/second speed speed ratio) of the subtransmission mechanism 30 by the primary rotation speed Npri before the non-coordinated shift, for example.

Next, the transmission controller 12 calculates the primary rotation speed Npri at the point where the through speed ratio Ratio reaches the destination through speed ratio DRatio on the basis of the current vehicle speed VSP and the destination through speed ratio DRatio.

The transmission controller 12 then compares the maximum value of the primary rotation speed Npri during the non-coordinated shift to the primary rotation speed Npri obtained when the through speed ratio Ratio reaches the destination through speed ratio DRatio, and when the fog ner exceeds the latter by at least a predetermined overshoot determination value, it is determined that overshoot would occur if a non-coordinated shift were performed. The overshoot determination value is set at an increase width that would not be recognized as overshoot by the driver, for example 300 revolutions, taking into consideration that a kick down shift is performed when the vehicle is accelerating and therefore the primary rotation speed Npri increases irrespective of overshoot. When it is determined that overshoot would occur, the processing advances to S18, and when it is deter mined that overshoot would not occur, the processing advances to S17.

In S16, the transmission controller 12 determines whether over-revving would occur in the primary rotation speed Npri if a non-coordinated shift were performed. This determination is made by determining whether or not the maximum value of the primary rotation speed Npri during a non-coordinated shift, calculated in S15, exceeds the upper limit value of the primary rotation speed Npri, and when the former exceeds the latter, the transmission controller 12 deter mines that over-revving would occur if a non-coordinated shift were performed. When it is determined that over-revving would occur, the processing advances to S18, and when it is determined that over-revving would not occur, the processing advances to S17.

When the processing advances to S17, the transmission controller 12 starts a non-coordinated shift, and when the processing advances to S18, the transmission controller 12 starts a coordinated shift.

When the non-coordinated shift is started in S17, the processing advances from S11 to S19, in which the non-coordinated shift is executed.

More specifically, first, in S19, the transmission controller 12 sets the target speed ratio tsubRatio of the subtransmission mechanism 30 to vary more gently than during a coordinated shift. This target speed ratio tsubRatio is a value used only to control the variator 20.

Next, in S20, the transmission controller 12 calculates the target speed ratio tvRatio of the variator 20 by dividing the target through speed ratio tRatio by the target speed ratio tsubRatio of the subtransmission mechanism 30. The target speed ratio tsubRatio of the subtransmission mechanism 30 varies more gently than during a coordinated shift, and therefore the target speed ratio tvRatio of the variator 20 also varies gently.

In S21, the transmission controller 12 shifts the variator 20 and the subtransmission mechanism 30. The variator 20 is controlled such that the speed ratio vRatio thereof matches the target speed ratio tvRatio, but since the target speed ratio tvRatio varies gently, as described above, speed ratio variation in the variator 20 is suppressed. Further, the transmission controller 12 reduces the oil pressure supplied to the High clutch 33 more quickly than during a coordinated shift and increases the oil pressure supplied to the Low brake 32 more quickly than during a coordinated shift, and as a result, the 2-1 shift in the subtransmission mechanism 30 is completed in a shorter time than during a coordinated shift.

When the coordinated shift is started in S18, on the other hand, the processing advances from S12 to S22, in which the coordinated shift is executed.

More specifically, the transmission controller 12 generates a target speed ratio tsubRatio of the subtransmission mechanism 30 that shifts from the speed ratio of the second speed to the speed ratio of the first speed smoothly, and calculates the target speed ratio tvRatio of the variator 20 by dividing the target through speed ratio tRatio by the target speed ratio tsubRatio of the subtransmission mechanism 30. The transmission controller 12 then controls the variator 20 such that the speed ratio vRatio of the variator 20 matches the target speed ratio tvRatio, and feedback-controls the oil pressure supplied to the Low brake 32 and the High clutch 33 such that the speed ratio subRatio of the subtransmission mechanism 30 matches the target speed ratio tsubRatio. As a result, the respective speed ratios of the variator 20 and the subtransmission mechanism 30 are controlled in opposite directions such that the through speed ratio Ratio reaches the target through speed ratio tRatio.

Hence, according to the control described above, when a second speed kick down shift is performed, a determination is made as to whether or not overshoot or over-revving will occur in the primary rotation speed Npri (S15, S16), and the through speed ratio Ratio is varied to the large speed ratio side quickly by performing a non-coordinated shift only when it is determined that neither will occur (S17, S19 to S21). On the other hand, when it is determined that overshoot or over-revving will occur in the primary rotation speed Npri, a coordinated shift is performed instead of the non-coordinated shift (S15, S16, S18).

Next, actions and effects obtained by performing the above control will be described.

Figure 7:
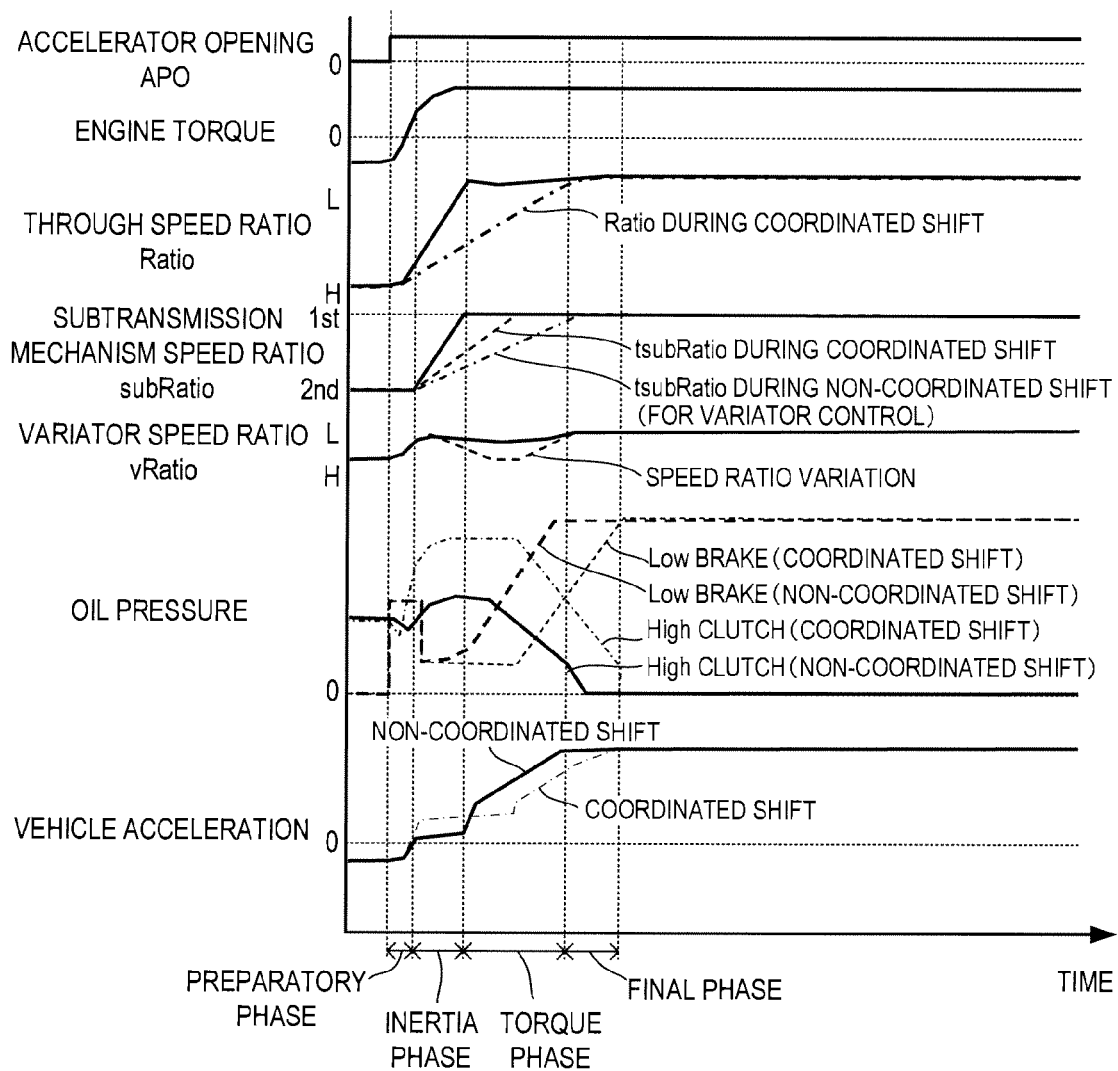
FIG. 7 is a time chart showing a case in which a non-coordinated shift is performed during the second speed kick down shift.

FIG. 7 is a time chart showing a case in which the accelerator pedal is depressed when the gear position of the subtransmission mechanism 30 is the second speed such that a second speed kick down shift is performed.

In this example, it is determined that neither overshoot nor over-revving will occur, and therefore a non-coordinated shift is performed. In the non-coordinated shift, the oil pressure supplied to the High clutch 33 is reduced more quickly (solid line) than during a coordinated shift (dot-dash line) and the oil pressure supplied to the Low brake 32 is increased more quickly (thick broken line) than during a coordinated shift (thin broken line), and therefore the speed ratio subRatio of the subtransmission mechanism 30 varies from the speed ratio of the second speed to the speed ratio of the first speed more quickly (solid line) than during a coordinated shift.

Further, with respect to the shift performed on the variator 20, the target speed ratio tsubRatio (dot-dash line) of the subtransmission mechanism 30 is varied more slowly than the target speed ratio (broken line) during a coordinated shift, and therefore the target speed ratio tvRatio calculated using the target speed ratio tsubRatio also varies gently. As a result, a situation in which the speed ratio vRatio of the variator 20 varies within a short time period is suppressed (solid line).

Hence, the through speed ratio Ratio obtained by multiplying the speed ratio vRatio of the variator 20 by the speed ratio subRatio of the subtransmission mechanism 30 varies to the large speed ratio side more quickly than during a coordinated shift, and accordingly, the driving force of the vehicle, and therefore vehicle acceleration, increases quickly. The speed ratio vRatio of the variator 20 shown by a broken line in the figure corresponds to a case in which the target speed ratio tvRatio of the variator 20 is calculated using the target speed ratio tsubRatio of the subtransmission mechanism 30 during a coordinated shift and the variator 20 is controlled on the basis thereof.

Hence, in this embodiment, when a second speed kick down shift accompanied by a 2-1 shift in the subtransmission mechanism 30 is performed, the non-coordinated shift is performed instead of the coordinated shift, and therefore the through speed ratio Ratio of the transmission 4 can be varied to the large speed ratio side quickly, enabling rapid driving force increase and an improvement in shift feeling.

Further, variation in the speed ratio of the variator 20 is suppressed during a non-coordinated shift, and therefore a situation in which a shift to the small speed ratio side and a shift to the large speed ratio side are performed within a brief time period, leading to deterioration of the fuel efficiency due to shift loss in the variator 20 and deterioration of the controllability of the subtransmission mechanism 30 due to source pressure variation and variation in the torque input into the subtransmission mechanism 30 caused by the shift in the variator 20, can be prevented from occurring.

Furthermore, since the shift timing of the subtransmission mechanism 30 is advanced in the non-coordinated shift, the through speed ratio Ratio may exceed the destination through speed ratio DRatio, but when it is determined that overshoot or over-revving will occur in the primary rotation speed Npri, a coordinated shift is performed instead of a non-coordinated shift, and therefore the driver can be prevented from experiencing an uncomfortable feeling due to overshoot and the engine 1 and transmission 4 can be prevented from being adversely affected by over-revving.

An embodiment of this invention was described above, but this embodiment is merely one example of application of this invention, and the technical scope of this invention is not limited to the specific constitutions of the embodiment.

For example, in the embodiment described above, a belt type continuously variable transmission is provided as the variator 20, but the variator 20 may be a continuously variable transmission in which a chain is wrapped around the pulleys 21, 22 instead of the V belt 23. Alternatively, the variator 20 may be a toroidal continuously variable transmission in which power rollers capable of tilting are disposed between an input disk and an output disk.

Further, in the above embodiment, the subtransmission mechanism 30 is a speed change mechanism having the first speed and second speed gear positions as forward gear positions, but the subtransmission mechanism 30 may be a speed change mechanism having three or more gear positions as forward gear positions.

Furthermore, the subtransmission mechanism 30 is formed using a Ravigneaux planetary gear mechanism, but is not limited to this constitution. For example, the subtransmission mechanism 30 may be constituted by a combination of a normal planetary gear mechanism and frictional engagement elements, or by a plurality of power transmission paths formed from a plurality of gear trains having different speed ratios, and frictional engagement elements for switching the power transmission paths.

Further, the hydraulic cylinders 23a, 23b are provided as actuators for displacing the movable conical plates of the pulleys 21, 22 in the axial direction, but the actuators may be driven electrically rather than hydraulically.

This application claims priority based on Japanese Patent Application No. 2009-169142, filed with the Japan Patent Office on Jul. 17, 2009, the entire content of which is incorporated into this specification.

What is claimed is:

1. A continuously variable transmission installed in a vehicle, comprising:
    a variator capable of varying a speed ratio continuously;
    a subtransmission mechanism provided in series with the variator and having a first gear position and a second gear position as forward gear positions, the second gear position having a smaller speed ratio than the first gear position;
    a destination through speed ratio setting unit which sets, on the basis of an operating condition of the vehicle, a destination through speed ratio, which is a target value to be reached by a through speed ratio serving as an overall speed ratio of the variator and the subtransmission mechanism in accordance with the operating condition;
    a target through speed ratio setting unit which sets, on the basis of the destination through speed ratio, a target through speed ratio serving as a transitional target value for making the through speed ratio to follow the destination through speed ratio at a predetermined transient response;
    a shift control unit which controls at least one of the variator and the subtransmission mechanism such that the through speed ratio follows the target through speed ratio;
    a coordinated shifting unit which performs a coordinated shift, in which the speed ratio of the subtransmission mechanism is varied while varying the speed ratio of the variator in an opposite direction to a speed ratio variation direction of the subtransmission mechanism so that the through speed ratio reaches the target through speed ratio, when modifying a gear position of the subtransmission mechanism;
    a second speed kick down shift determining unit which determines that a second speed kick down shift accompanied by modification of the gear position of the subtransmission mechanism from the second gear position to the first gear position is to be performed due to depression of an accelerator pedal; and
    a non-coordinated shifting unit which performs a non-coordinated shift, in which the gear position of the subtransmission mechanism is modified from the second gear position to the first gear position at a higher speed than when the gear position of the subtransmission mechanism is modified by the coordinated shift while permitting a deviation between the through speed ratio and the target through speed ratio, instead of the coordinated shift performed by the coordinated shifting unit when the second speed kick down shift determining unit determines that the second speed kick down shift is to be performed.

2. The continuously variable transmission as defined in claim 1, further comprising a variator shift suppressing unit which suppresses variation in a speed ratio of the variator during the non-coordinated shift.

3. The continuously variable transmission as defined in claim 1, further comprising a overshoot determining unit which determines whether or not an overshoot, in which an input rotation speed of the continuously variable transmission increases beyond an input rotation speed of the continuously variable transmission obtained when the through speed ratio is varied to the destination through speed ratio by at least a predetermined increase width, will occur as a result of the non-coordinated shift,
    wherein, when the overshoot determining unit determines that the overshoot will occur, the non-coordinated shifting unit does not perform the non-coordinated shift even if the second speed kick down shift determining unit determines that the second speed kick down shift is to be performed, and instead, the coordinated shifting unit performs the coordinated shift.

4. The continuously variable transmission as defined in claim 1, further comprising an over-revving determining unit which determines whether or not over-revving, in which the input rotation speed of the continuously variable transmission exceeds a predetermined upper limit value, will occur as a result of the non-coordinated shift,
    wherein, when the over-revving determining unit determines that the over-revving will occur, the non-coordinated shifting unit does not perform the non-coordinated shift even if the second speed kick down shift determining unit determines that the second speed kick down shift is to be performed, and instead, the coordinated shifting unit performs the coordinated shift.

5. A control method for a continuously variable transmission which is installed in a vehicle and includes a variator capable of varying a speed ratio continuously, and a subtransmission mechanism provided in series with the variator and having a first gear position and a second gear position as forward gear positions, the second gear position having a smaller speed ratio than the first gear position, the control method comprising:
 setting, on the basis of an operating condition of the vehicle, a destination through speed ratio, which is a target value to be reached by a through speed ratio serving as an overall speed ratio of the variator and the subtransmission mechanism in accordance with the operating condition;
 setting, on the basis of the destination through speed ratio, a target through speed ratio serving as a transitional target value for making the through speed ratio to follow the destination through speed ratio at a predetermined transient response;
 controlling at least one of the variator and the subtransmission mechanism such that the through speed ratio follows the target through speed ratio;
 performing a coordinated shift, in which the speed ratio of the subtransmission mechanism is varied while varying the speed ratio of the variator in an opposite direction to a speed ratio variation direction of the subtransmission mechanism so that the through speed ratio reaches the target through speed ratio, when modifying a gear position of the subtransmission mechanism;
 determining that a second speed kick down shift accompanied by modification of the gear position of the subtransmission mechanism from the second gear position to the first gear position is to be performed due to depression of an accelerator pedal; and
 performing a non-coordinated shift, in which the gear position of the subtransmission mechanism is modified from the second gear position to the first gear position at a higher speed than when the gear position of the subtransmission mechanism is modified by the coordinated shift while permitting a deviation between the through speed ratio and the target through speed ratio, instead of the coordinated shift when it is determined that the second speed kick down shift is to be performed.

6. The control method as defined in claim 5, further comprising suppressing variation in a speed ratio of the variator during the non-coordinated shift.

7. The control method as defined in claim 5, further comprising determining whether or not an overshoot, in which an input rotation speed of the continuously variable transmission increases beyond an input rotation speed of the continuously variable transmission obtained when the through speed ratio is varied to the destination through speed ratio by at least a predetermined increase width, will occur as a result of the non-coordinated shift,
 wherein, when it is determined that the overshoot will occur, the non-coordinated shift is not performed even if it is determined that the second speed kick down shift is to be performed, and instead, the coordinated shift is performed.

8. The control method as defined in claim 5, further comprising determining whether or not over-revving, in which the input rotation speed of the continuously variable transmission exceeds a predetermined upper limit value, will occur as a result of the non-coordinated shift,
 wherein, when it is determined that the over-revving will occur, the non-coordinated shift is not performed even if it is determined that the second speed kick down shift is to be performed, and instead, the coordinated shift is performed.

9. A continuously variable transmission installed in a vehicle, comprising:
 a variator capable of varying a speed ratio continuously;
 a subtransmission mechanism provided in series with the variator and having a first gear position and a second gear position as forward gear positions, the second gear position having a smaller speed ratio than the first gear position;
 destination through speed ratio setting means for setting, on the basis of an operating condition of the vehicle, a destination through speed ratio, which is a target value to be reached by a through speed ratio serving as an overall speed ratio of the variator and the subtransmission mechanism in accordance with the operating condition;
 target through speed ratio setting means for setting, on the basis of the destination through speed ratio, a target through speed ratio serving as a transitional target value for making the through speed ratio to follow the destination through speed ratio at a predetermined transient response;
 shift control means for controlling at least one of the variator and the subtransmission mechanism such that the through speed ratio follows the target through speed ratio;
 coordinated shifting means for performing a coordinated shift, in which the speed ratio of the subtransmission mechanism is varied while varying the speed ratio of the variator in an opposite direction to a speed ratio variation direction of the subtransmission mechanism so that the through speed ratio reaches the target through speed ratio, when modifying a gear position of the subtransmission mechanism;
 second speed kick down shift determining means for determining that a second speed kick down shift accompanied by modification of the gear position of the subtransmission mechanism from the second gear position to the first gear position is to be performed due to depression of an accelerator pedal; and
 non-coordinated shifting means for performing a non-coordinated shift, in which the gear position of the subtransmission mechanism is modified from the second gear position to the first gear position at a higher speed than when the gear position of the subtransmission mechanism is modified by the coordinated shift while permitting a deviation between the through speed ratio and the target through speed ratio, instead of the coordinated shift performed by the coordinated shifting means when the second speed kick down shift determining means determines that the second speed kick down shift is to be performed.

10. The continuously variable transmission as defined in claim 9, further comprising variator shift suppressing means for suppressing variation in a speed ratio of the variator during the non-coordinated shift.

11. The continuously variable transmission as defined in claim 9, further comprising overshoot determining means for determining whether or not an overshoot, in which an input rotation speed of the continuously variable transmission increases beyond an input rotation speed of the continuously variable transmission obtained when the through speed ratio is varied to the destination through speed ratio by at least a predetermined increase width, will occur as a result of the non-coordinated shift, wherein, when the overshoot determining means determines that the overshoot will occur, the non-coordinated shifting means does not perform the non-coordinated shift even if the second speed kick down shift determining means determines that the second speed kick down shift is to be performed, and instead, the coordinated shifting means performs the coordinated shift.

12. The continuously variable transmission as defined in claim 9, further comprising over-revving determining means for determining whether or not over-revving, in which the input rotation speed of the continuously variable transmission exceeds a predetermined upper limit value, will occur as a result of the non-coordinated shift, wherein, when the over-revving determining means determines that the over-revving will occur, the non-coordinated shifting means does not perform the non-coordinated shift even if the second speed kick down shift determining means determines that the second speed kick down shift is to be performed, and instead, the coordinated shifting means performs the coordinated shift.

13. A continuously variable transmission for a vehicle, comprising:
a variator capable of varying a speed ratio continuously;
a subtransmission mechanism provided in series with the variator and having a first gear position and a second gear position as forward gear positions, the second gear position having a smaller speed ratio than the first gear position;
a coordinated shifting unit which performs a coordinated shift, in which a shift speed of the subtransmission is made identical to a shift speed of the variator, and the speed ratio of the variator is varied in an opposite direction to a speed ratio variation direction of the subtransmission mechanism while the subtransmission is shifted, when modifying a gear position of the subtransmission mechanism; and
a non-coordinated shifting unit which performs a non-coordinated shift, in which the coordinated shift is stopped and the shift speed of the subtransmission is made faster than the shift speed during the coordinated shift when there is a kick-down request from a driver and a downshift of the subtransmission is possible.

14. The continuously variable transmission as defined in claim 13, further comprising a variator shift suppressing unit which suppresses variation in a speed ratio of the variator during the non-coordinated shift.

15. The continuously variable transmission as defined in claim 13, further comprising:
a destination through speed ratio setting unit which sets, on the basis of an operating condition of the vehicle, a destination through speed ratio, which is a target value to be reached by a through speed ratio serving as an overall speed ratio of the variator and the subtransmission mechanism in accordance with the operating condition; and
an overshoot determining unit which determines whether or not an overshoot, in which an input rotation speed of the continuously variable transmission increases beyond an input rotation speed of the continuously variable transmission obtained when the destination through speed ratio is varied to a target value to be reached by at least a predetermined increase width, will occur as a result of the non-coordinated shift,
wherein, when the overshoot determining unit determines that the overshoot will occur, the non-coordinated shifting unit does not perform the non-coordinated shift even if there is the kick-down request and the downshift of the subtransmission is possible, and instead, the coordinated shifting unit performs the coordinated shift.

16. The continuously variable transmission as defined in claim 13, further comprising an over-revving determining unit which determines whether or not over-revving, in which the input rotation speed of the continuously variable transmission exceeds a predetermined upper limit value, will occur as a result of the non-coordinated shift,
wherein, when the over-revving determining unit determines that the over-revving will occur, the non-coordinated shifting unit does not perform the non-coordinated shift even if there is the kick-down request and the downshift of the subtransmission is possible, and instead, the coordinated shifting unit performs the coordinated shift.

* * * * *